(12) United States Patent
Brütt et al.

(10) Patent No.: US 12,151,662 B2
(45) Date of Patent: Nov. 26, 2024

(54) METHOD FOR THE BRAKE CONTROL OF A VEHICLE COMBINATION

(71) Applicant: WABCO Europe BVBA, Brussels (BE)

(72) Inventors: Mirko Brütt, Ronnenberg (DE); Ivo Laskawy, Hannover (DE); Lars Volker, Seelze (DE)

(73) Assignee: ZF CV Systems Europe BV, Brussels (BE)

(*) Notice: Subject to any disclaimer, the term of this patent is extended or adjusted under 35 U.S.C. 154(b) by 388 days.

(21) Appl. No.: 17/192,983

(22) Filed: Mar. 5, 2021

(65) Prior Publication Data
US 2021/0284109 A1 Sep. 16, 2021

(30) Foreign Application Priority Data
Mar. 10, 2020 (DE) .................. 10 2020 106 448.9

(51) Int. Cl.
*B60T 8/171* (2006.01)
*B60T 7/04* (2006.01)
(Continued)

(52) U.S. Cl.
CPC ............ *B60T 8/171* (2013.01); *B60T 7/04* (2013.01); *B60T 13/265* (2013.01);
(Continued)

(58) Field of Classification Search
CPC .......... B60T 8/171; B60T 7/04; B60T 13/265; B60T 13/581; B60T 17/221; B60T 2270/88
See application file for complete search history.

(56) References Cited

U.S. PATENT DOCUMENTS 8,864,247 B2 * 10/2014 Hilberer .................... B60T 7/20
303/122.1
2017/0174197 A1 * 6/2017 Eberling ............... B60T 13/403

FOREIGN PATENT DOCUMENTS

DE 19633834 * 2/1998 ............... B60T 7/20
DE 19633834 A1 2/1998
(Continued)

OTHER PUBLICATIONS

WABCO Publication No. 815 010 082 3, "Pneumatic Braking System Agriculture and Forestry—Product Catalogue," Bern, Switzerland, 2017, Edition 11, Version 1, 266 pages, URL: https://www.wabco-customercentre.com/catalog/docs/8150200823.pdf.
(Continued)

*Primary Examiner* — Joan T Goodbody
(74) *Attorney, Agent, or Firm* — Dickinson Wright PLLC

(57) ABSTRACT

A method of brake control of a vehicle combination (2) composed of a tractor vehicle (4) with an electronically controlled braking system (5) and a trailer vehicle (6, 8) with a pneumatically controlled pneumatic braking system (7, 9), involves introducing the brake control pressure ($p_{BC}$) of the trailer vehicle (6, 8) into a tractor brake control line (19) extending to a tractor vehicle-side "brake" coupling head (26) via an electronically controlled trailer control valve (13) of the tractor vehicle (4). At the beginning of a braking operation, a pressure pulse (34) exceeding a target brake control pressure ($p_{BC\_soll}$) is introduced into the tractor brake control line (19). The volume of a trailer brake control line (28, 29, 32) coupled to the "brake" coupling head (26) is ascertained, and the absolute value ($\Delta p_{PI}$) and/or the duration ($\Delta t_{PI}$) of the pressure pulse (34) introduced are/is established depending on the ascertained volume.

18 Claims, 3 Drawing Sheets

(51) Int. Cl.
*B60T 13/26* (2006.01)
*B60T 13/58* (2006.01)
*B60T 17/22* (2006.01)

(52) U.S. Cl.
CPC .......... *B60T 13/581* (2013.01); *B60T 17/221* (2013.01); *B60T 2270/88* (2013.01)

(56) References Cited

FOREIGN PATENT DOCUMENTS

| DE | 19955798 | * | 5/2001 | ............... B60T 8/00 |
|----|----------|---|--------|---------------------------|
| DE | 19955798 A1 | | 5/2001 | |
| DE | 102013019240 A1 | | 6/2015 | |
| DE | 102014002614 A1 | | 8/2015 | |

OTHER PUBLICATIONS

WABCO Publication No. 815 010 208 3 "EBS 3—Electronic Braking System—System Description," Bern, Switzerland, 2016, Edition 1, Version 4, 44 pages, URL: https://doc.wabco-auto.com/ProductFiles/anteros/Document/8150202083.pdf.

* cited by examiner

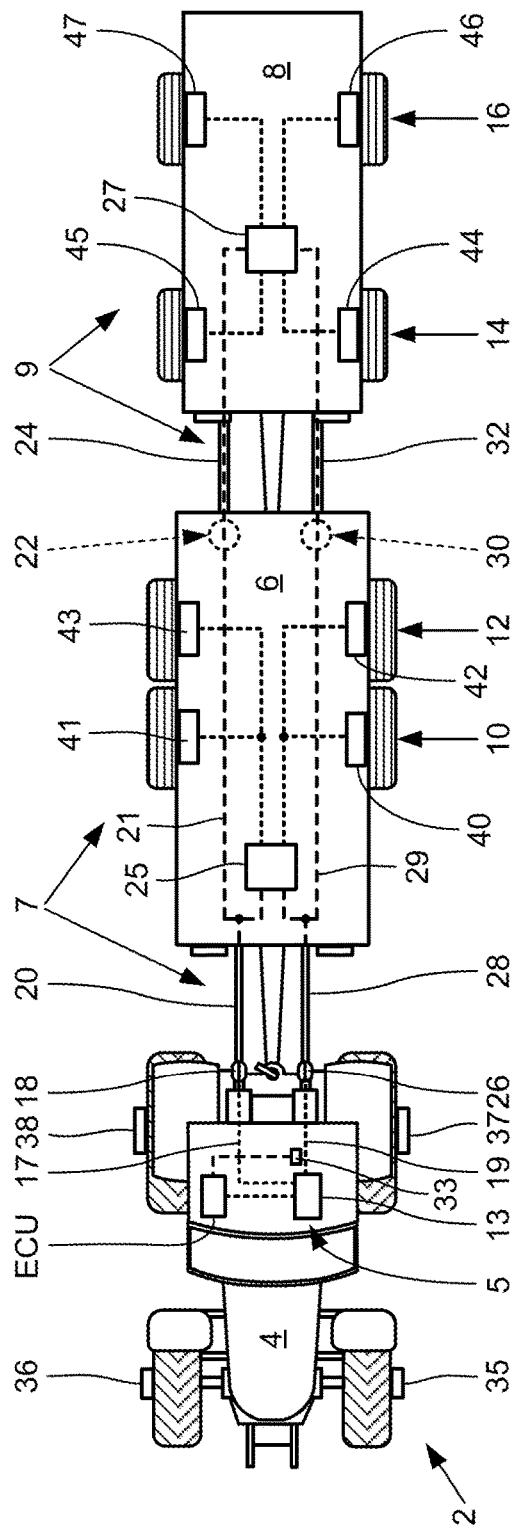
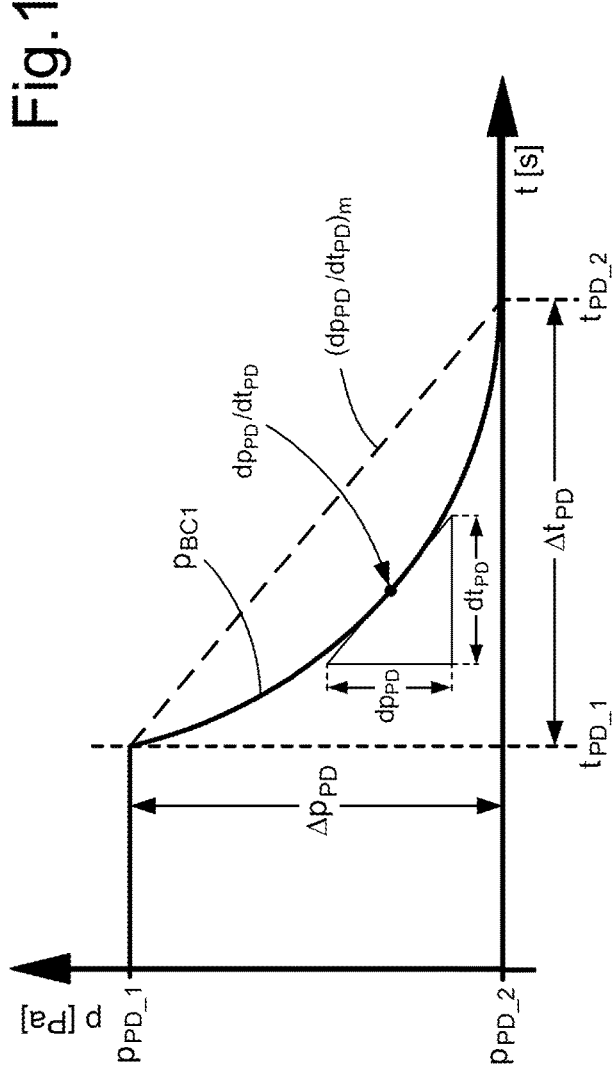
Fig.1
Fig.3

METHOD FOR THE BRAKE CONTROL OF A VEHICLE COMBINATION

TECHNICAL FIELD

The invention relates to a method for the brake control of a vehicle combination, which is made up of a tractor vehicle with an electronically controlled hydraulic or pneumatic braking system and at least one trailer vehicle with a pneumatically controlled pneumatic braking system, and in which the brake control pressure of the trailer vehicle is applied into at least one tractor vehicle-side brake control line extending to a tractor vehicle-side "brake" coupling head via an electronically controlled trailer control valve of the tractor vehicle, wherein, at the beginning of a braking operation, a pressure pulse exceeding the brake control pressure to be applied is introduced into the tractor vehicle-side brake control line.

In the case of the heavy commercial vehicles utilized in Europe, which are intended for trips on roads, approximately 95% of the vehicle combinations and, in fact, tractor vehicles as well as trailer vehicles, comprise electronically controlled pneumatic braking systems. In vehicle combinations of this type, brake signals are transmitted largely instantaneously, on an electronic path, from a braking value transducer operatively connected to the brake pedal of the tractor vehicle to a trailer brake valve of the trailer vehicle and, there, associated brake pressures for the wheel brake cylinders of the trailer vehicles are set. As a result, the trailer vehicle is decelerated in a timely manner during a braking operation and a jack-knifing of the vehicle combination about its fifth-wheel coupling, trailer coupling, or drawbar axle is prevented. The pneumatic brake control line that is present anyway for safety reasons is utilized, within the scope of a redundancy, only in the event of a failure of the electronic brake control. In the case of vehicle combinations with two trailer vehicles, intended for road transport, which are known as so-called Euro-Combiliners or gigaliners, the first trailer vehicle is also equipped with a trailer control valve for the second trailer vehicle, so that a fast response of the vehicle brakes of all trailer vehicles is ensured here, also in the case of redundancy.

In the case of vehicle combinations that are intended for use in agriculture and forestry, i.e., primarily for off-road use, relatively modern tractor vehicles with an electronically controlled hydraulic or pneumatic braking system are mostly utilized in combination with older trailer vehicles, wherein the latter are equipped with a pneumatically controlled pneumatic braking system. For the control of the braking system of the aforementioned trailer vehicle, the braking system of the tractor vehicle is equipped with an electronically controlled trailer control valve, by means of which the particular brake control pressure for the trailer vehicle is applied into a brake control line extending to the "brake" coupling head (yellow).

Multiple embodiments of an electronically controlled hydraulic braking system of a tractor vehicle with an electronically controlled trailer control valve for a trailer vehicle with a pneumatically controlled pneumatic braking system are described in DE 10 2014 002 614 A1. The trailer control valve provided there includes an inlet valve, an outlet valve, a relay valve, and a breakaway valve, as well as a pressure sensor for detecting the applied brake control pressure present at the "brake" coupling head (yellow) of the tractor vehicle.

The configuration of a pneumatically controlled pneumatic braking system of a trailer vehicle, which is provided for the coupling of one further trailer vehicle, can be found, by way of example, in the WABCO publication No. 815 010 082 3, "PNEUMATIC BRAKING SYSTEM AGRICULTURE AND FORESTRY—PRODUCT CATALOGUE" in chapter 4 "Air compression systems"/4.2 "Dual line pneumatic braking systems" on page 24.

In the case of a vehicle combination, which is made up of a tractor vehicle with an electronically controlled hydraulic or pneumatic braking system and at least one trailer vehicle with a pneumatically controlled pneumatic braking system, the volume of the brake control line—connected at the "brake" coupling head (yellow)—of the at least one trailer vehicle can be problematically large, because the pressure increase applied during a braking operation via the trailer control valve arrives with delay at the trailer brake valve of the trailer vehicle or, in the case of two trailer vehicles, at the trailer brake valves of the multiple trailer vehicles. As a result, the straightening of the vehicle combination by the actuation of the wheel brakes of the trailer vehicle or the trailer vehicles takes place with delay and an undesirable jack-knifing of the vehicle combination about a trailer coupling or drawbar axle can occur. The braking-induced pressure increase at the control input of the trailer brake valve or at the control inputs of the multiple trailer brake valves and, thereby, the actuation of the wheel brakes of the trailer vehicle or the trailer vehicles is delayed that much more, the larger the volume is of the trailer-side brake control lines. The problem is therefore particularly serious in the case of larger trailer vehicles with a correspondingly long brake control line and in the case of two coupled trailer vehicles, in the case of which the volume of the brake control lines can be up to two liters.

In the WABCO publication No. 815 010 208 3 "EBS 3—"ELECTRONIC BRAKING SYSTEM—SYSTEM DESCRIPTION," chapter 5 "Funktionsbeschreibung" (Function description)/5.2 "Bremsenmanagement" (Brake management)/5.2.8 "Anhängersteuerung" (Trailer control) describes on page 14 that, at the beginning of a braking operation, a pressure pulse designated there as a short pressure injection into the brake control line can take place, in order to improve the response of the trailer brakes. However, this WABCO publication does not mention any further details regarding the design of the pressure pulse to be applied into the brake control line.

SUMMARY

The problem addressed by the invention is therefore that of providing a method for the brake control of a vehicle combination of the type mentioned at the outset, which specifies the design of the pressure pulse to be applied into the brake control line at the beginning of a braking operation.

Accordingly, the invention relates to a method for the brake control of a vehicle combination, which is made up of a tractor vehicle with an electronically controlled hydraulic or pneumatic braking system and at least one trailer vehicle with a pneumatically controlled pneumatic braking system, and in which the brake control pressure of the trailer vehicle is applied into at least one tractor vehicle-side brake control line extending to a tractor vehicle-side "brake" coupling head by means of an electronically controlled trailer control valve of the tractor vehicle, wherein, at the beginning of a braking operation, a pressure pulse exceeding the brake control pressure to be applied is introduced into the tractor vehicle-side brake control line.

In order to solve the stated problem, it is provided in this method that the volume of at least one brake control line—coupled at the "brake" coupling head—of the at least one trailer vehicle is ascertained, and that the absolute value $\Delta p_{PI}$ and/or the duration $\Delta t_{PI}$ of the pressure pulse introduced into the at least one brake control line of the at least one trailer vehicle are/is established depending on the volume of the at least one brake control line.

Due to the ascertainment of the volume of the at least one brake control line of the at least one trailer vehicle and the establishment of the absolute value $\Delta p_{PI}$ and/or the duration $\Delta t_{PI}$ of the applied pressure pulse depending on the volume of the at least one brake control line, the pressure pulse is optimally adapted to the at least one brake control line of the at least one trailer vehicle and a fast response characteristic of the wheel brakes of the trailer vehicle is achieved.

Because, before a driving operation, various trailer vehicles with different volumes of their brake control lines can be coupled onto a tractor vehicle, the volume of the brake control line of the trailer vehicle (or, in the case of two trailer vehicles, of the brake control lines of the two trailer vehicles) is preferably ascertained after every start-up of the tractor vehicle and, thereafter, stored in a non-volatile data memory of an electronic control unit. The data memory is preferably assigned to the electronic control unit of the trailer control valve of the tractor vehicle.

In order to ascertain the volume of the at least one trailer-side brake control line, it is provided that, during a disengagement of the wheel brakes of the vehicle combination, the air pressure prevailing in the brake control lines connected to the tractor vehicle-side "brake" coupling head is detected by sensors during the pressure drop $\Delta p_{PD}$, and that, on the basis of the time profile of the air pressure, the duration $\Delta t_{PD}$ of the pressure drop $\Delta p_{PD}$ and/or the mean pressure gradient $(dp_{PD}/dt_{PD})_m$ of the pressure drop $\Delta p_{PD}$ are/is determined, and that, on the basis of the duration of the pressure drop $\Delta t_{PD}$ and/or the mean pressure gradient $(dp_{PD}/dt_{PD})_m$ of the pressure drop $\Delta p_{PD}$, the volume of the at least one brake control line of the at least one trailer vehicle is determined.

Here, it is preferably provided that, in the case of a long duration $\Delta t_{PD}$ of the pressure drop $\Delta p_{PD}$ exceeding a predetermined time period, a total volume of the at least one brake control line of more than one trailer vehicle can be inferred.

Alternatively or additionally, it can also be provided that, in the event that the mean pressure gradient $|(dp_{PD}/dt_{PD})_m|$ of the pressure drop $\Delta p_{PD}$ falls below a predetermined limit pressure gradient, a total volume of the at least one brake control line of more than one trailer vehicle is inferred.

Provided a current value of the volume of the at least one brake control line was not ascertained, a value of the volume of the at least one brake control line can be utilized that was ascertained, and stored, in a preceding driving operation of the vehicle combination. Alternatively, it can also be provided that a predefined standard value of the volume of a brake control line is utilized, provided a current value of the volume of the at least one brake control line was not ascertained.

In order to design the applied pressure pulse, it can be provided that the absolute value $\Delta p_{PI}$ of the pressure pulse, as compared to the target brake control pressure $p_{BC\_soll}$ to be applied, is increased as the volume of the at least one brake control line increases.

In order to avoid damage to the at least one brake control line and the valves connected thereto, it is provided according to another refinement of the method that the absolute value $\Delta p_{PI}$ of the pressure pulse, as compared to the target brake control pressure $p_{BC\_soll}$ to be applied, is limited by a maximum permissible pressure $p_{BC\_max}$ in the at least one brake control line and, in fact, in such a way that a previously established maximum pressure $p_{BC\_max}$ in the at least one brake control line is not exceeded during the pressure pulse ($p_{BC\_soll}+\Delta p_{PI} \leq p_{BC\_max}$).

Alternatively or additionally to the pressure difference $\Delta p_{PI}$ of the pressure pulse, the duration $\Delta t_{PI}$ of the pressure pulse can also be increased as the volume of the at least one brake control line increases.

The invention is explained in greater detail in the following by reference to an exemplary embodiment represented in the attached drawings.

BRIEF DESCRIPTION OF THE DRAWINGS

In the drawings:

FIG. 1 shows a top view of a vehicle combination made up of a tractor vehicle and two trailer vehicles;

FIG. 3 shows profiles, represented in a diagram, of brake control pressures at a coupling head of a brake control line over time for ascertaining the volume of the brake control line.

DETAILED DESCRIPTION OF THE DRAWINGS

Figure 2:
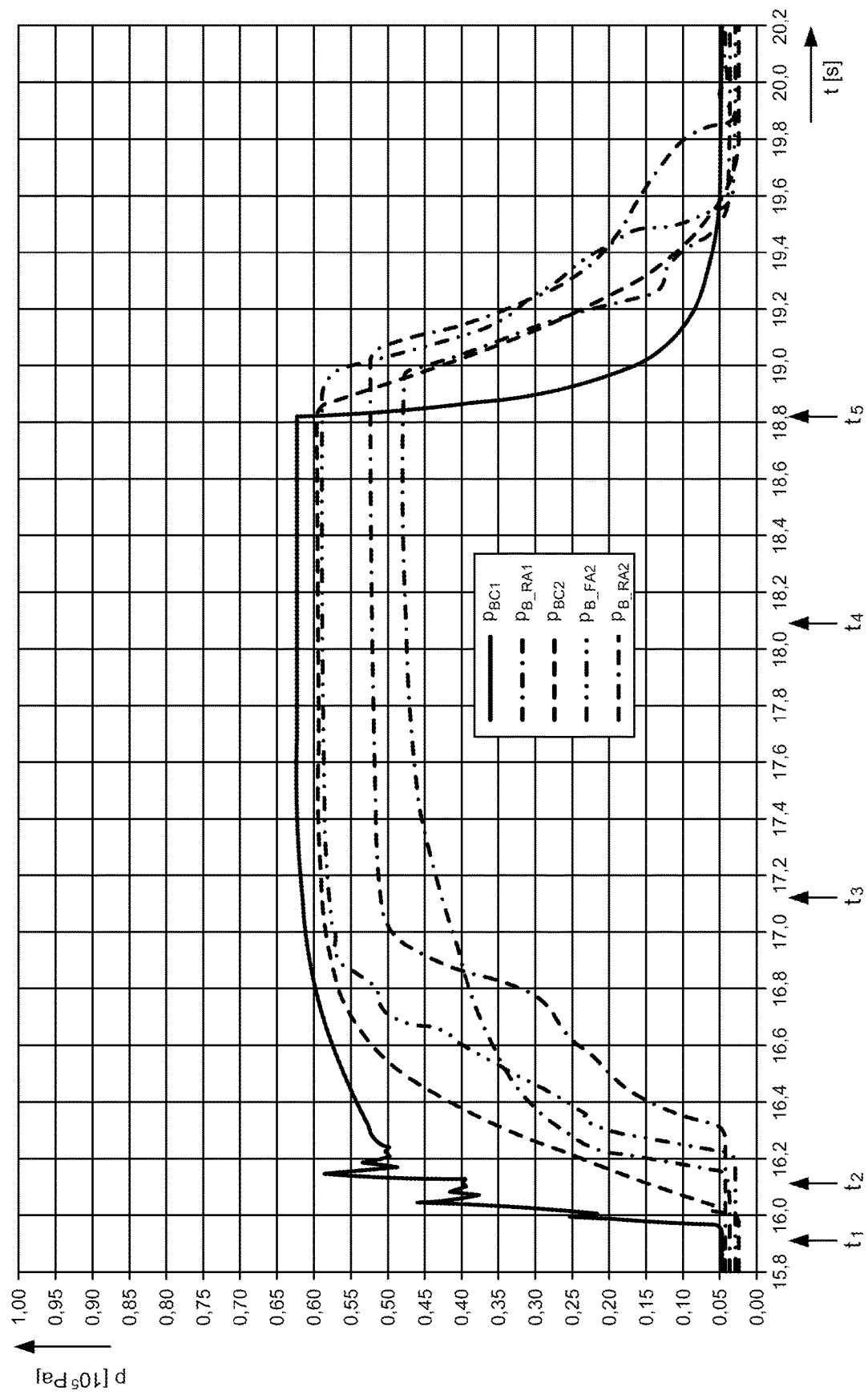
FIG. 2 shows profiles, represented in a diagram, of brake control pressures and wheel brake pressures of the vehicle combination according to FIG. 1 over time without an application of a pressure pulse.

The vehicle combination 2 depicted in a top view in FIG. 1 includes a tractor vehicle 4 designed as an agricultural tractor, a first trailer vehicle 6 coupled onto the tractor vehicle 4, and a second trailer vehicle 8 coupled onto the first trailer vehicle 6. The first trailer vehicle 6 is designed as a tandem axle trailer with two tandem axles 10, 12. The second trailer vehicle 8 is a drawbar trailer with a steerable front axle 14 and a rear axle 16 rigidly secured at a frame. The vehicle combination could also have a reversed trailer sequence or two identical trailer types. Wheel brakes 35, 36, 37, 38; 40, 41, 42, 43; 44, 45, 46, 47 are arranged at the wheels of the tractor vehicle 4 and at the wheels of the two trailer vehicles 6, 8 for decelerating the same.

The agricultural tractor 4 comprises an electronically controlled hydraulic braking system 5 (not completely represented). The first trailer vehicle 6 comprises a pneumatically controlled and pneumatically actuatable first braking system 7 with a first supply line 20 and a first brake control line 28. The second trailer vehicle 8 also comprises a pneumatically controlled and pneumatically actuatable second braking system 9 with a second supply line 24 and a second brake control line 32.

For the brake control of the wheel brakes 40, 41, 42, 43; 44, 45, 46, 47 of the two trailer vehicles 6, 8, the braking system 5 of the agricultural tractor 4 comprises a trailer control valve 13, controlled by an electronic control unit ECU, from which a supply line 17 of the tractor vehicle 4 extends to a tractor vehicle-side "supply" coupling head (red) 18 and a brake control line 19 of the tractor vehicle 4 extends to a tractor vehicle-side "brake" coupling head (yellow) 26. The supply line 20 of the first trailer vehicle 6 is connected at the tractor vehicle-side "supply" coupling head 18, and the brake control line 28 of the first trailer vehicle 6 is connected at the tractor vehicle-side "brake" coupling head 26.

From the supply line 20 of the first trailer vehicle 6, a branched-off supply line 21 extends to a trailer-side "supply" coupling head (red) 22 (not readily apparent in FIG. 1) situated at the rear of the first trailer vehicle 6 and at which a second supply line 24 of the second trailer vehicle 8 is connected. Similarly, a brake control line 29 branched-off from the brake control line 28 of the first trailer vehicle 6 also extends to a trailer-side "brake" coupling head (yellow) 30 (not readily apparent in FIG. 1) situated at the rear of the first trailer vehicle 6 and at which a second brake control line 32 of the second trailer vehicle 8 is connected.

The two trailer-side supply lines 20, 24 and the two trailer-side brake control lines 28, 32 extend to a first trailer brake valve 25 at the first trailer vehicle 6 and to a second trailer brake valve 27 at the second trailer vehicle 8, in which the wheel brake pressures $p_B$ at the wheel brakes 40, 41, 42, 43; 44, 45, 46, 47 of the vehicle axles 10, 12; 14, 16 of the two trailer vehicles 6, 8 are set. Due to the large common volume of the brake control lines 28, 29, 32, in the case of a braking operation without further measures, there is a time-delayed response of the wheel brakes 40, 41, 42, 43; 44, 45, 46, 47 at the vehicle axles 10, 12; 14, 16 of the two trailer vehicles 6, 8. This is illustrated in the diagram depicted in FIG. 2. In this diagram, the profiles of the brake control pressure $p_{BC1}$ at the "brake" coupling head 26 of the tractor vehicle 4, of the wheel brake pressure $p_{B\_RA1}$ at the wheel brakes 40, 41, 42, 43 of the two vehicle axles 10, 12 of the first trailer vehicle 6, of the brake control pressure $p_{BC2}$ at the "brake" coupling head 30 of the first trailer vehicle 6, of the wheel brake pressure $p_{B\_FA2}$ at the wheel brakes 44, 45 of the front axle 14 of the second trailer vehicle 8, and of the wheel brake pressure $p_{B\_RA2}$ at the wheel brakes 46, 47 of the rear axle 16 of the second trailer vehicle 8 during a braking operation are depicted over time t.

The conventionally controlled braking operation represented there begins at the point in time $t_1$, after which, initially, the brake control pressures $p_{BC1}$, $p_{BC2}$ at the two "brake" coupling heads 26, 30 increase. At the point in time $t_2$, the wheel brake pressures $p_{B\_RA1}$, $p_{B\_FA2}$, $p_{B\_RA2}$ at the wheel brakes 40, 41, 42, 43; 44, 45, 46, 47 of the vehicle axles 10, 12; 14, 16 of the two trailer vehicles 6, 8 also increase. At approximately the point in time $t_3$, the brake control pressures $p_{BC1}$, $p_{BC2}$ at the two "brake" coupling heads 26, 30 and the wheel brake pressures $p_{B\_FA2}$, $p_{B\_RA2}$ at the wheel brakes 44, 45, 46, 47 of the vehicle axles 14, 16 of the second trailer vehicle 8 reach their setpoint values, while the maximum value of the wheel brake pressure $p_{B\_RA1}$ at the wheel brakes 40, 41, 42, 43 of the vehicle axles 10, 12 of the first trailer vehicle 6 is first reached at the point in time $t_4$. At the point in time $t_5$, the braking operation is terminated, and the brake control pressures $p_{BC1}$, $p_{BC2}$ as well as the wheel brake pressures $p_{B\_RA1}$, $p_{B\_FA2}$, $p_{B\_RA2}$ subsequently drop again to values close to zero.

In order to improve the response characteristic of the wheel brakes 40, 41, 42, 43; 44, 45, 46, 47 at the vehicle axles 10, 12; 14, 16 of the two trailer vehicles 6, 8, it is provided that, at the beginning of a braking operation, a pressure pulse exceeding the brake control pressure $p_{BC1\_soll}$ to be applied is applied, by the trailer control valve 13, into the tractor vehicle-side brake control line 19 extending to the "brake" coupling head 26 of the tractor vehicle 4 and, thereby, also into the connected brake pressure line 28 of the first trailer vehicle 6, into the brake pressure line 29 branched off therefrom, and into the brake control line 32 of the second trailer vehicle 8. The absolute value $\Delta p_{PI}$ of the applied pressure pulse, by which the pressure pulse exceeds the brake control pressure $p_{BC1\_soll}$ actually to be applied, and/or the duration $\Delta t_{PI}$ of the applied pressure pulse are/is established depending on the volume of the connected brake control lines 28, 29, 32 of the coupled trailer vehicles 6, 8. The pressure difference $\Delta p_{PI}$ and/or the duration $\Delta t_{PI}$ of the pressure pulse are/is increased as the volume of the connected brake control lines 28, 29, 32 increases.

The volume of the connected trailer-side brake control lines 28, 29, 32 is ascertained in advance during a disengagement of the wheel brakes 35, 36, 37, 38; 40, 41, 42, 43; 44, 45, 46, 47 or the parking brakes of the vehicle combination 2 in such a way that, during a disengagement of the wheel brakes 35, 36, 37, 38; 40, 41, 42, 43, 44, 45, 46, 47 of the vehicle combination 2, the air pressure difference $\Delta p_{PD}$ setting in, in the brake control lines 19, 28, 29, 32 connected to the tractor vehicle-side "brake" coupling head 26, is measured during the pressure drop by the electronic control unit ECU by means of a pressure sensor 33, and that, on the basis of the time profile of the air pressure, the duration $\Delta t_{PD}$ of the pressure drop and/or the mean pressure gradient $(dp_{PD}/dt_{PD})_m$ of the pressure drop are/is determined, and that, on the basis of the duration of the pressure drop $\Delta t_{PD}$ and/or the mean pressure gradient $(dp_{PD}/dt_{PD})_m$ of the pressure drop, the volume of the connected brake control lines 19, 28, 29, 32 of the coupled trailer vehicles 6, 8 is determined.

A corresponding time profile of the brake control pressure $p_{BC1}$ present at the "brake" coupling head 26 of the tractor vehicle 4 during a disengagement of the wheel brakes is depicted in the diagram of FIG. 3. As is readily apparent, the brake control pressure $p_{BC1}$ drops degressively along the represented curve profile from an initial value $p_{PD\_1}$ at a first point in time $t_{PD\_1}$ before the pressure drop over a time period $\Delta t_{PD}$ up to a second point in time $t_{PD\_2}$ after the pressure drop to a second value $p_{PD\_2}$. The pressure gradient $dp_{PD}/dt_{PD}$ of the pressure drop $\Delta p_{PD}$ is given at an arbitrary point in time in the time period $\Delta t_{PD}$ by the pressure differential $dp_{PD}$ with respect to the time differential $dt_{PD}$. The mean pressure gradient $(dp_{PD}/dt_{PD})_m$ of the pressure drop $\Delta p_{PD}$ is represented by a wide-dashed line.

Figure 4:
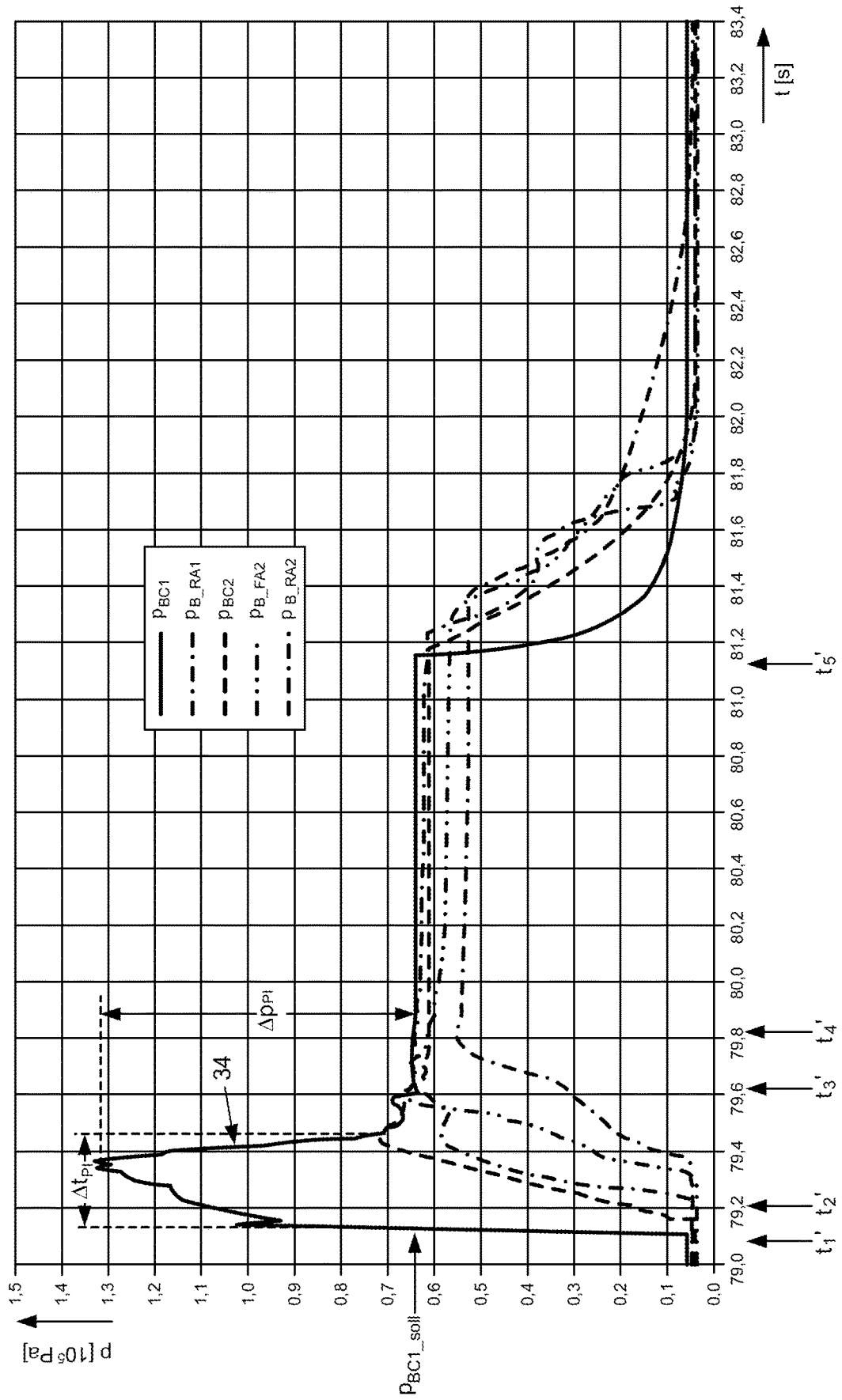
FIG. 4 shows profiles, represented in a diagram, of brake control pressures and wheel brake pressures of the vehicle combination according to FIG. 1 over time with an application of a pressure pulse.

The effect of the application of a pressure pulse 34 at the beginning of a braking operation is represented in the diagram depicted in FIG. 4, in which the time profiles of the brake control pressure $p_{BC1}$ at the "brake" coupling head 26 of the tractor vehicle 4, of the wheel brake pressure $p_{B\_RA1}$ at the wheel brakes 40, 41, 42, 43 of the vehicle axles 10, 12 of the first trailer vehicle 6, of the brake control pressure $p_{BC\_2}$ at the "brake" coupling head 30 of the first trailer vehicle 6, of the wheel brake pressure $p_{B\_FA2}$ at the wheel brakes 44, 45 of the front axle 14 of the second trailer vehicle 8, and of the wheel brake pressure $p_{B\_RA2}$ at the wheel brakes 46, 47 of the rear axle 16 of the second trailer vehicle 8 during a braking operation according to the invention are depicted.

The braking operation begins at the point in time $t_1'$, after which, initially, the brake control pressures $p_{BC1}$, $p_{BC2}$ at the two "brake" coupling heads 26, 30 increase. Due to the pressure pulse 34 applied with the absolute value $\Delta p_{PI}$ and the duration $\Delta t_{PI}$, the wheel brake pressures $p_{B\_RA1}$, $p_{B\_FA2}$, $p_{B\_RA2}$ at the wheel brakes 40, 41, 42, 43; 44, 45, 46, 47 of the vehicle axles 10, 12; 14, 16 of the trailer vehicles 6, 8 now increase already at the point in time $t_2'$. At the point in time $t_3'$, the brake control pressures $p_{BC1}$, $p_{BC2}$ at the two "brake" coupling heads 26, 30 reach their setpoint values $p_{BC1\_soll}$ relatively quickly. Shortly thereafter, at approximately the point in time $t_4'$, the wheel brake pressures $p_{B\_RA1}$, $p_{B\_FA2}$, $p_{B\_RA2}$ at the wheel brakes 40, 41, 42, 43; 44, 45, 46, 47 of the vehicle axles 10, 12; 14, 16 of the trailer vehicles 6, 8 also reach their setpoint values. At the point in time $t_5'$, the braking operation is terminated, whereupon the brake control pressures $p_{BC1}$, $p_{BC2}$ and the wheel brake pressures $p_{B\_RA1}$, $p_{B\_FA2}$, $p_{B\_RA2}$ drop again to values close to zero.

It becomes apparent from the comparison of the diagrams from FIG. 2 and FIG. 4 that the brake control pressure $p_{BC2}$ at the "brake" coupling head 30 of the first trailer vehicle 6 and the wheel brake pressures $p_{B\_RA1}$, $p_{B\_FA2}$, $p_{B\_RA2}$ at the wheel brakes 40, 41, 42, 43; 44, 45, 46, 47 of the vehicle axles 10, 12; 14, 16 of both trailer vehicles 6, 8 increase considerably sooner and reach their setpoint values considerably faster with the application of the pressure pulse 34 at the beginning of the braking operation according to FIG. 4. As a result, an apparently improved braking operation of the vehicle combination 2 is achieved, because the vehicle combination 2 is straight during a braking operation and a jack-knifing about a trailer coupling of one of the trailer vehicles 6, 8 or about the drawbar axle of the first trailer vehicle 6 is prevented. Due to the preceding ascertainment of the volume of the brake control lines 19, 28, 29, 32 and the adaptation of the absolute value $\Delta p_{PI}$ and/or of the duration $\Delta t_{PI}$ of the applied pressure pulse 34 depending on the volume of the brake control lines 19, 28, 29, 32, the pressure pulse 34 is optimally matched to the particular trailer vehicles 6, 8 coupled onto the tractor vehicle 4.

While the above description constitutes the preferred embodiments of the present invention, the invention is susceptible to modification, variation and change without departing from the proper scope and fair meaning of the accompanying claims.

LIST OF REFERENCE NUMBERS

- 2 vehicle combination
- 4 tractor vehicle, agricultural tractor
- 5 braking system of the tractor vehicle
- 6 first trailer vehicle, tandem axle trailer
- 7 braking system of the first trailer vehicle; first pneumatic braking system
- 8 second trailer vehicle, drawbar trailer
- 9 braking system of the second trailer vehicle; second pneumatic braking system
- 10 first tandem axle at the first trailer vehicle
- 12 second tandem axle at the first trailer vehicle
- 13 trailer control valve
- 14 front axle of the second trailer vehicle
- 16 rear axle of the second trailer vehicle
- 17 supply line of the tractor vehicle
- 18 tractor vehicle-side "supply" coupling head (red)
- 19 tractor vehicle-side brake control line
- 20 supply line of the first trailer vehicle
- 21 supply line branched off from supply line 20
- 22 "supply" coupling head (red) at the first trailer vehicle
- 24 supply line of the second trailer vehicle
- 25 trailer brake valve at the first trailer vehicle
- 26 tractor vehicle-side "brake" coupling head (yellow)
- 27 trailer brake valve at the second trailer vehicle
- 28 brake control line of the first trailer vehicle
- 29 brake control line branched off from the brake control line 28
- 30 "brake" coupling head (yellow) at the first trailer vehicle
- 32 brake control line of the second trailer vehicle
- 33 pressure sensor
- 34 pressure pulse
- 35 first wheel brake at the front axle of the tractor vehicle
- 36 second wheel brake at the front axle of the tractor vehicle
- 37 first wheel brake at the rear axle of the tractor vehicle
- 38 second wheel brake at the rear axle of the tractor vehicle
- 40 first wheel brake at the first tandem axle
- 41 second wheel brake at the first tandem axle
- 42 first wheel brake at the second tandem axle
- 43 second wheel brake at the second tandem axle
- 44 first wheel brake at the front axle of the second trailer vehicle
- 45 second wheel brake at the front axle of the second trailer vehicle
- 46 first wheel brake at the rear axle of the second trailer vehicle
- 47 second wheel brake at the rear axle of the second trailer vehicle
- ECU electronic control unit
- $p_{B\_RA1}$ wheel brake pressure at the wheel brakes of the first trailer vehicle
- $p_{B\_FA2}$ wheel brake pressure at the wheel brakes of the front axle of the second trailer vehicle
- $p_{B\_RA2}$ wheel brake pressure at the wheel brakes of the rear axle of the second trailer vehicle
- $p_{BC}$ brake control pressure
- $p_{BC\_max}$ maximum pressure in the brake control line
- $p_{BC\_soll}$ target brake control pressure (general) to be applied
- $p_{BC1}$ brake control pressure at the "brake" coupling head 26 of the tractor vehicle
- $p_{BC1\_soll}$ brake control pressure to be applied
- $p_{BC2}$ brake control pressure at the "brake" coupling head 30 of the first trailer vehicle
- $p_{PD\_1}$ initial brake control pressure before the pressure drop
- $p_{PD\_2}$ brake control pressure after the pressure drop
- $dp_{PD}$ pressure differential of the pressure drop
- $dp_{PD}/dt_{PD}$ pressure gradient of the pressure drop
- $(dp_{PD}/dt_{PD})_m$ mean pressure gradient of the pressure drop
- $\Delta p_{PD}$ pressure drop, air pressure difference caused by the pressure drop
- $\Delta p_{PI}$ absolute value of the pressure pulse
- t time
- $t_1$-$t_5$ points in time
- $t_1'$-$t_5'$ points in time
- $t_{PD\_1}$ first point in time (before the pressure drop)
- $t_{PD\_2}$ second point in time (after the pressure drop)
- $dt_{PD}$ time differential of the pressure drop
- $\Delta t_{PD}$ duration of the pressure drop
- $\Delta t_{PI}$ duration of the pressure pulse

The invention claimed is:

1. A method for controlling brakes of a vehicle combination (2) composed of a tractor vehicle (4) with an electronically controlled hydraulic or pneumatic braking system (5) and a trailer vehicle (6, 8) with a pneumatically controlled pneumatic braking system (7, 9), the method comprising the following steps:

introducing, during a brake operation, via an electronically controlled trailer control valve (13) of the tractor vehicle (4), a brake control pressure (psc) of the trailer vehicle (6, 8) into at least one tractor brake control line (19) extending to a tractor vehicle-side "brake" coupling head (26);

introducing, at the beginning of the braking operation, a pressure pulse (34) exceeding a target brake control pressure ($p_{BC\_soll}$) to be applied into the tractor brake control line (19);

ascertaining determining, by an electronic control unit (ECU), an available internal volume of at least one trailer brake control line (28, 29, 32) coupled to the "brake" coupling head (26) and in fluid communication with the tractor brake control line (19), wherein the available internal volume depends on a quantity of trailer vehicles coupled to the brake coupling head (26) via the at least one trailer brake control line (28, 29, 32); and determining at least one of an absolute value ($\Delta p_{PI}$) and a duration ($\Delta t_{PI}$) of the pressure pulse (34) communicated to the at least one trailer brake control line (28, 29, 32) depending on the volume of the at least one trailer brake control line (28, 29, 32) wherein the volume of the at least one trailer-side brake control line (28, 29, 32) is determined via the following steps:

detecting, via sensors, during a pressure drop ($\Delta p_{PD}$) due to a disengagement of the wheel brakes (35, 36, 37, 38; 40, 41, 42, 43, 44, 45, 46, 47) of the vehicle combination (2), the air pressure prevailing in the tractor brake control line (19) and the at least one trailer brake control line (28, 29, 32) connected to the tractor vehicle-side "brake" coupling head (26);

determining, based on a time profile of the air pressure, at least one of the duration ($\Delta t_{PD}$) of the pressure drop ($\Delta p_{PD}$) and the mean pressure gradient ($(dp_{PD}/dt_{PD})_m$) of the pressure drop ($\Delta p_{PD}$); and determining, on the basis of at least one of the duration of the pressure drop ($\Delta t_{PD}$) and the mean pressure gradient ($(dp_{PD}/dt_{PD})_m$) of the pressure drop ($\Delta p_{PD}$), the volume of the at least one trailer brake control line (28, 29, 32) of the at least one trailer vehicle (6, 8).

2. The method as claimed in claim 1, wherein the ascertained determining available volume of the at least one trailer brake control line (28, 29, 32) of the trailer vehicle (6, 8) is ascertaining determining after every start-up of the tractor vehicle (4) and, thereafter, stored in a non-volatile data memory of then electronic control unit (ECU).

3. The method as claimed in claim 1, comprising the further step of inferring, in response to a long duration ($\Delta t_{PD}$) of the pressure drop ($\Delta p_{PD}$) exceeding a predetermined time period, a total volume of the at least one trailer brake control line (28, 29, 32) of more than one trailer vehicle (6, 8).

4. The method as claimed in claim 1, wherein, in the event that the mean pressure gradient ($|(dp_{PD}/dt_{PD})_m|$) of the pressure drop ($\Delta p_{PD}$) falls below a predetermined limit pressure gradient, a total volume of the at least one trailer brake control line (28, 29, 32) of more than one trailer vehicle (6, 8) is inferred.

5. The method as claimed in claim 1, wherein, when a current value of the available internal volume of the at least one trailer brake control line (28, 29, 32) has not been ascertained determined, a value of the available internal volume of the at least one trailer brake control line (28, 29, 32) is utilized that was ascertaining determining, and stored, in a preceding driving operation of the vehicle combination (2).

6. The method as claimed in claim 1, wherein, when a current value of the available internal volume of the at least one trailer brake control line (28, 29, 32) has not been ascertained determined, a predefined standard value of the available internal volume of the at least one brake control line (28, 29, 32) is utilized.

7. The method as claimed in claim 1, wherein the absolute value ($\Delta p_{PI}$) of the pressure pulse, as compared to the target brake control pressure ($p_{BC\_soll}$) is greater with increasing volume of the at least one trailer brake control line (28, 29, 32).

8. The method as claimed in claim 1, wherein the absolute value ($\Delta p_{PI}$) of the pressure pulse, as compared to the target brake control pressure ($p_{BC\_soll}$) to be applied, is limited by a previously established maximum permissible pressure ($p_{BC\_max}$) in the at least one trailer brake control line (28, 29, 32) in such a way that the previously established maximum pressure ($p_{BC\_max}$) in the at least one trailer brake control line (28, 29, 32) is not exceeded during the pressure pulse ($p_{BC\_soll} + \Delta p_{PI} \leq p_{BC\_max}$).

9. The method as claimed in claim 1, wherein the duration ($\Delta t_{PI}$) of the pressure pulse is greater with increasing volume of the at least one trailer brake control line (28, 29, 32).

10. A method for controlling brakes of a vehicle combination (2) including a tractor vehicle (4) with an electronically controlled hydraulic or pneumatic braking system (5) and a trailer vehicle (6, 8) with a pneumatically controlled pneumatic braking system (7, 9), the method comprising the following steps:

determining, by an electronic control unit (ECU), an available internal volume of at least one trailer brake control line (28, 29, 32) coupled to a tractor vehicle-side "brake" coupling head (26) of a tractor vehicle (4), the trailer brake control line in fluid communication with at least one tractor brake control line (19) that extends to the "brake" coupling head, wherein the available internal volume depends on a quantity of trailer vehicles coupled to the "brake" coupling head (26) via the at least one trailer brake control line (28, 29, 32); and after determining the volume of the at least one trailer brake control line, determining, depending on the determined volume of the at least one trailer brake control line (28, 29, 32), at least one of an absolute value ($\Delta p_{PI}$) and a duration ($\Delta t_{PI}$) of a pressure pulse (34) to be applied and communicated to the at least one trailer brake control line (28, 29, 32);

wherein the tractor vehicle (4) includes an electronically controlled trailer control valve (13) wherein, during a braking operation, a brake control pressure ($p_{BC}$) of the trailer vehicle (6, 8) is introduced via the electronically controlled trailer control valve (13) of the tractor vehicle (4) into the at least one tractor brake control line (19) that extends to the coupling head (26); and introducing, at the beginning of the braking operation, the pressure pulse (34), wherein the pressure pulse exceeds a target brake control pressure ($p_{BC\_soll}$) to be applied into the tractor brake control line (19);

wherein the available internal volume of the at least one trailer-side brake control line (28, 29, 32) is determined via the following steps:

detecting, via sensors, during a pressure drop ($\Delta p_{PD}$) due to a disengagement of the wheel brakes (35, 36, 37, 38; 40, 41, 42, 43, 44, 45, 46, 47) of the vehicle combination (2), the air pressure prevailing in the tractor brake control line (19) and the at least one trailer brake control line (28, 29, 32) connected to the tractor vehicle-side "brake" coupling head (26);

determining, based on a time profile of the air pressure, at least one of the duration ($\Delta t_{PD}$) of the pressure drop ($\Delta p_{PD}$) and the mean pressure gradient (($dp_{PD}/dt_{PD})_m$) of the pressure drop ($\Delta p_{PD}$); and determining, on the basis of at least one of the duration of the pressure drop ($\Delta t_{PD}$) and the mean pressure gradient (($dp_{PD}/dt_{PD})_m$) of the pressure drop ($\Delta p_{PD}$), the volume of the at least one trailer brake control line (28, 29, 32) of the at least one trailer vehicle (6, 8).

11. The method as claimed in claim 10, wherein the available internal volume of the at least one trailer brake control line (28, 29, 32) of the trailer vehicle (6, 8) is determined after every start-up of the tractor vehicle (4) and, thereafter, stored in a non-volatile data memory of the electronic control unit (ECU).

12. The method as claimed in claim 10, comprising the further step of determining, in response to a long duration ($\Delta t_{PD}$) of the pressure drop ($\Delta p_{PD}$) exceeding a predetermined time period, a total available internal volume of the at least one trailer brake control line (28, 29, 32) of more than one trailer vehicle (6, 8).

13. The method as claimed in claim 10, wherein, in the event that the mean pressure gradient ($|(dp_{PD}/dt_{PD})_m|$) of the pressure drop ($\Delta p_{PD}$) falls below a predetermined limit pressure gradient, a total available internal volume of the at least one trailer brake control line (28, 29, 32) of more than one trailer vehicle (6, 8) is determined.

14. The method as claimed in claim 10, wherein, when a current value of the available internal volume of the at least one trailer brake control line (28, 29, 32) has not been determined, a value of the available internal volume of the at least one trailer brake control line (28, 29, 32) is utilized that was determined, and stored, in a preceding driving operation of the vehicle combination (2) for determining the absolute value or duration of the pressure pulse.

15. The method as claimed in claim 10, wherein, when a current value of the volume of the at least one trailer brake control line (28, 29, 32) has not been determined, a predefined standard value of the available internal volume of the at least one brake control line (28, 29, 32) is utilized to determine the absolute value or duration of the pressure pulse.

16. The method as claimed in claim 10, wherein the absolute value ($\Delta p_{PI}$) of the pressure pulse, as compared to the target brake control pressure ($p_{BC\_soll}$) is greater with increasing volume of the at least one trailer brake control line (28, 29, 32).

17. The method as claimed in claim 10, wherein the absolute value ($\Delta p_{PI}$) of the pressure pulse, as compared to the target brake control pressure ($p_{BC\_soll}$) to be applied, is limited by a previously established maximum permissible pressure ($p_{BC\_max}$) in the at least one trailer brake control line (28, 29, 32) in such a way that the previously established maximum pressure ($p_{BC\_max}$) in the at least one trailer brake control line (28, 29, 32) is not exceeded during the pressure pulse ($p_{BC\_soll}+\Delta p_{PI} \leq p_{BC\_max}$).

18. The method as claimed in claim 10, wherein the duration ($\Delta t_{PI}$) of the pressure pulse is greater with increasing volume of the at least one trailer brake control line (28, 29, 32).

* * * * *